UNITED STATES PATENT OFFICE.

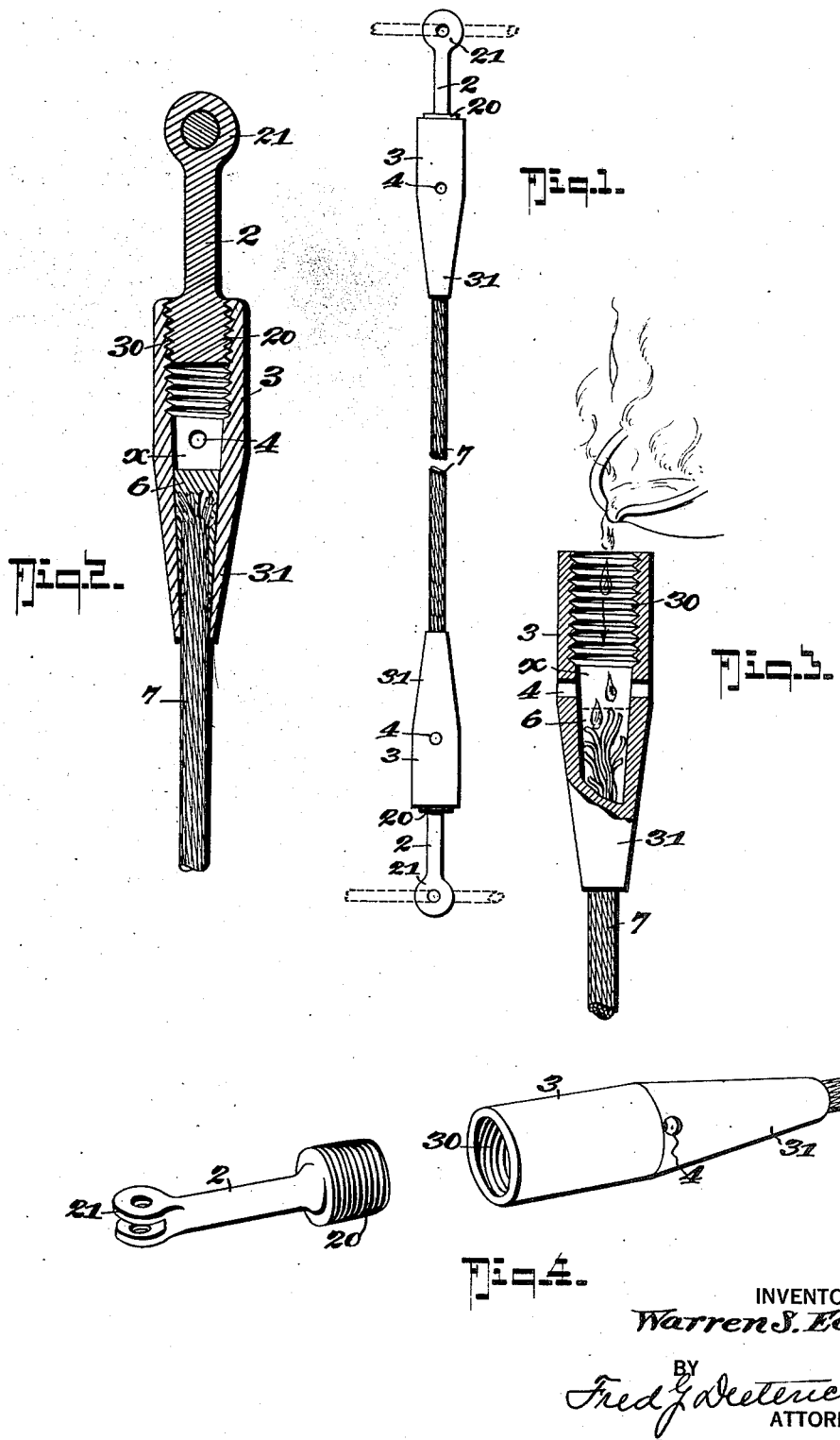

WARREN S. EATON, OF PLAINFIELD, NEW JERSEY.

CABLE-COUPLING.

1,293,383.　　　　Specification of Letters Patent.　　Patented Feb. 4, 1919.

Application filed July 20, 1917. Serial No. 181,822.

*To all whom it may concern:*

Be it known that I, WARREN S. EATON, a citizen of the United States, residing at Plainfield, in the county of Union and State of New Jersey, have invented a new and Improved Cable-Coupling, of which the following is a specification.

My invention is in the nature of an improved construction of cable coupling and is more especially designed for providing a simple, inexpensive and easily applied cable clamp or coupling particularly well adapted for use in connection with guy cables for aeroplane structures and for dispensing with the necessity of splicing loops, split clamps and other like devices.

With other objects in view that will hereinafter appear, my invention is an improved cable coupling that embodies the peculiar features of construction, and the novel combination of parts presently explained, specifically pointed out in the appended claim and illustrated in the accompanying drawing, in which:

Figure 1 is a side elevation of a cable section with my improved coupling device applied to each end thereof for effecting a brace or stay connection between two opposite rod members.

Fig. 2 is a vertical section of my improved construction of cable coupling.

Fig. 3 is a vertical section of the cable receiving socket member and illustrates the manner in which the spread cable strands or ends are secured within the said socket.

Fig. 4 is a perspective view of the two members that constitute my rope or cable coupling, the said members being shown as separated.

My construction of cable coupling embodies essentially two parts, a member 3 having an internally threaded screw socket 30 at one end and a tapered clamping sleeve 31 at the other end, the latter portion 31 beginning some distance from the threads in the socket end, to provide a chamber *w* between the said socket and the clamping end to allow for forming the member 3 with an adjusting aperture 4 for the reception of a suitable turning implement, whereby the said member 3 may be readily utilized as a turn buckle for tightening up the cable. 2 designates a stem on a solid externally threaded end or head 20 that screws into the socket 30 when the parts are operatively connected, and 21 indicates the stem eye that receives the pin or other member to which the device is to be applied.

The cable 7 is secured within the tapered sleeve 31 in the manner best shown in Fig. 3, from which it will be seen that the end of the cable, that is to be clamped, has its several strands separated for being firmly embedded in a lead filler 6 which is produced by pouring the metal into the top of the member 3 before the member 2 is connected therewith, see Fig. 3.

It is understood that in the use of my cable coupling device, one of such devices is secured upon each end of the cable, as indicated in Fig. 1, one being right-hand threaded and the other left-hand threaded.

By securing the cable end in the tapered sleeve in the manner stated and pouring only enough molten metal into the socket to bring the top of the metal wedging element some distance below the internal threads of the socket end, ample provision is made for providing the member 3 with an aperture 4 in one side, as before stated, or a pair of oppositely disposed apertures for the convenient reception of a turning implement for applying turn buckle action to the said member 3.

I am aware that rope clamp devices have heretofore been provided in which is included a threaded head on a stem portion and a sleeve having a threaded socket for receiving the head on the stem portion and formed with a tapering portion for receiving the end of the cable or rope but, so far as I know, in such types of rope connecting or clamping devices, a wedge core is usually held between the separated ends of the cable, the loose or separated ends of which are usually bent and hammered over the core and then held down against spreading out by having the threaded head on the stem screw down tightly against the said spread cable strands.

In such types of clamps, there is no provision for screwing up or tightening the rope socket member relatively to the stem, since the socket and the stem members, when operatively connected, are in close contact and have no "turn buckle" adjustment.

In my construction, opposing cable sections may be quickly connected by joining the sleeve member that has the threaded head to one of the said sections and the other or pocket member to the other cable section. By bringing the two members of the coupling into engaging position and, since the pocket-like member has a turn buckle function, the two coupling members, as they are drawn together, draw up the cable sections to produce a tight connection between the opposite members to which the said cable sections are attached.

What I claim is:

A cable coupling comprising two sets of coupling members, each including a sleeve having a threaded socket, and head members having threaded engagement with the respective sockets, a cable permanently uniting the sleeves of the two sets, and each head member having a shank with provision for attachment to a fixed body, the threads of one sleeve socket being the reverse of the other.

WARREN S. EATON